Feb. 7, 1939.  H. COLOMB  2,146,329

CAP JEWEL BEARING FOR CLOCKWORK MECHANISM

Filed April 10, 1936

Inventor:
H. Colomb
By Glascock Downing & Seebold
Attys.

Patented Feb. 7, 1939

2,146,329

UNITED STATES PATENT OFFICE 2,146,329

CAP JEWEL BEARING FOR CLOCKWORK MECHANISM

Henri Colomb, Lausanne, Switzerland

Application April 10, 1936, Serial No. 73,765
In Switzerland January 9, 1936

9 Claims. (Cl. 58—140)

The present invention relates to an arrangement comprising a cap jewel bearing for clockwork mechanism and has as its principal object the provision of such a bearing which effectively protects the pivot of the supported arbor against any excessive stress. This arrangement is characterized by the feature that the bearing is composed of a removable body which comprises the bush and the cap jewel, and which is arranged so that it may be mounted on the support by means whereby, when no excessive stresses are exerted by the pivot on the bearing or vice versa, the axis of at least the bush is placed in its exactly correct position. Further when such stresses occur the said means produce either a momentary radial displacement of the bush and of the cap jewel, and thus of the entire bearing yielding under the said stresses, or a momentary axial displacement of at least the cap jewel, or further the two said radial and axial displacements simultaneously in such a way that the robust parts integral with the arbor come into contact with the support of the bearing when the stress exceeds a certain value.

The accompanying drawing illustrates by way of example a practical embodiment of the invention and some modifications of detail parts thereof.

Figure 1:
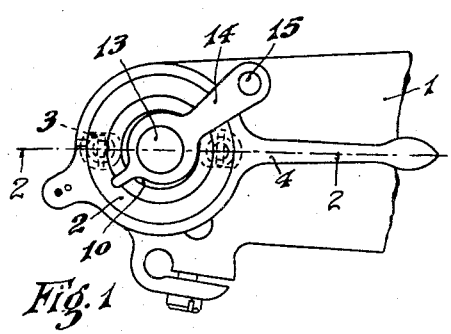
Figure 1 is a plan view of a pivot bearing for a watch balance spindle according to the invention.
Figure 2:
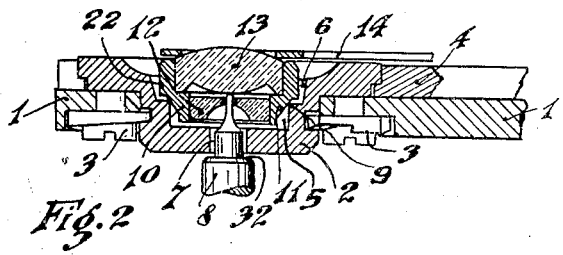
Figure 2 is an axial section along the line 2—2 of Fig. 1.

In Figures 1 and 2, the part 1 of the frame which supports the arrangement is a balance wheel bridge, the shaft of which is denoted by 8. The arrangement comprises a bearing support 2 mounted in a hole of the bridge 1 and fixed by keys 3 which are also protected by patent and which liberate the bearing support for dismounting, by means of a rotation of a fraction of a turn of these keys.

The bearing support 2 is provided with a circular recess formed of a recess portion 5 and of a recess portion 6 of greater diameter; the circular walls of the two portions are separated by an annular shoulder 9, on the rounded or bevelled edge of which rests a frustro-conical surface 11 of an annular body 10, which constitutes the bearing so that it holds the bush 12 and the cap jewel 13. The bush is fixedly mounted in the ring 10 while the cap jewel 13 is adjusted in it so as to be able to be separated for cleaning. A spring 14 bears against the cap jewel 13; its method of mounting is described with reference to Figure 4. The bearing support 2 is in addition arranged to serve for the mounting of a regulator 4. Its central hole 7 is slightly greater in diameter than the stem of the shaft 8. The shoulder 32 of the shaft 8 is at a small distance from the lower face of the bearing support 2.

It will be seen in Figure 2 that, when a shock is applied, for example, from right to left on the frame or an abnormal stress is applied from left to right on the balance wheel, the stem bears against the bearing support 2 in order to support the stress without damage, then, when a force pushes the spindle upwards, the shoulder 32 will meet the face of the bearing support as in known arrangements. During a lateral displacement the bearing 10 with its bush 12 and its cap jewel 13, is displaced laterally while becoming slightly inclined and sliding by its truncated conical surface 11 on the edge of the recess 5. A shoulder 22 is provided which makes continuity with this truncated conical surface 11 and is disposed closely to the shoulder 9 of the support 2, so that when the bearing receives a shock, this shoulder limits the inclination of the bearing by its contact with the shoulder 9.

The annular member 10 of the bearing (Fig. 3) is provided with a cylindrical surface portion 26 adjacent to the smaller end of the conical surface 11. This cylindrical surface portion is useful for measuring purposes during the cutting operation for producing the conical surface on the member 10, to ascertain whether the pitch of the conical surface is correct.

Figure 3:
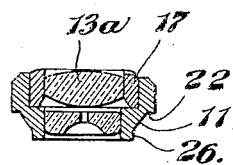
Figure 3 shows a modification of a detail.

Figure 3 shows that the cap jewel 13a may be mounted in the bearing through the intermediary of a setting 17.

The cap jewel or the cap jewel setting may be mounted in any way in the bearing with slight friction with the objects that upon an axial shock the entire bearing surely takes part in the displacement as is the case upon a transversal shock.

Figure 4:
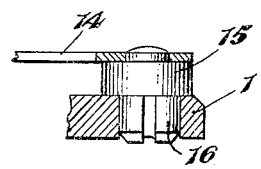
Figure 4 is a sectional view, drawn to a larger scale, of a detail of the bearing.

Figure 4 shows the mounting of the spring 14 which holds the removable bearing member 10 in its position on the edge of the shoulder 9. The spring end is riveted on a pivot 15 having a split end 16 frictionally engaged in a hole of the bridge 1. When the cap jewel or the annular member 10 must be removed, the spring 14 will be turned about the axis of the pivot 15 so as to disclose the removable bearing member.

Although in the figures described so far, the bush and the cap jewel are in separate pieces from the outside part of the bearing, one of the two may be in one piece with this part and of the same material, in a recess of which the other is lodged.

Figure 5:
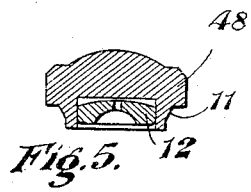
Figures 5 and 6 are sectional views of two modifications of a bearing member.
Figure 6:
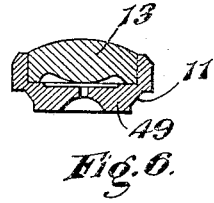

Figure 5 shows a cap bearing member 48 provided with a recess in which is inserted the perforated bearing member 12. The member 48 is provided with the conical surface 11 which coacts with the shoulder 9 of the support 2 in Figure 2. Figure 6 shows a perforated bearing member 49 provided with a recess for lodging the cap bearing member 13. The perforated member 49 is provided with the conical centering surface 11.

One of the advantages of the arrangement is that the oiling of the bearing can be carried out in the usual manner, according to which the oil is placed exactly in the center of the cap jewel due to the fact that it is introduced through the hole of the bearing; this is not possible with the other known shock absorbing arrangements.

Another advantage of the arrangement consists in that the oil rests in position during shocks which displace the shaft of the moving part with respect to the frame. In fact during a lateral shock, the cap jewel accompanies the bush in its displacement and in its inclination in such a way that the oil is not spread out.

The bearing claimed possesses in addition the advantage of being easily manipulated.

What I claim is:

1. In a timepiece movement, the combination with a frame member, said frame member having a recess provided at its bottom with a central aperture, of a spindle having its end extending through said aperture, a removable pivot bearing loosely carried in said recess, said bearing including a perforated bearing member and a cap bearing member, said recess in the frame member and said bearing having coacting surfaces for seating the bearing in the recess, one at least of said surfaces being conical, a resilient member yieldingly urging said removable bearing in contact with said surface of the recess in the frame member and tending to center the bearing in the recess, coacting abutting portions on said spindle end and on said frame member for limiting lateral displacements of the spindle, and coacting transversely extending shoulders on said frame member in said recess and on said bearing in close relationship with each other whereby upon a lateral displacement of the spindle and a rocking movement of said bearing, said shoulders make contact with each other before said abutting portions on the spindle and on the frame member meet each other.

2. In a timepiece movement, the combination with a frame member, said frame member having a recess provided at its bottom with a central aperture, of a spindle having its end extending through said aperture, a removable pivot bearing loosely carried in said recess, said bearing including a perforated bearing member and a cap bearing member, said recess in the frame member and said bearing having coacting surfaces for seating the bearing in the recess, one at least of said surfaces being conical, a resilient member yieldingly urging said removable bearing in contact with said surface of the recess in the frame member and tending to center the bearing in the recess, said resilient member being pivotally mounted on said frame member and frictionally maintained in bearing engaging position, and coacting abutting portions on said spindle end and on said frame member for limiting instantaneous displacements of the spindle.

3. A time piece movement as defined in claim 1, wherein said bearing comprises an annular member supporting said perforated bearing member and said cap bearing member, one of said bearing members being fixedly mounted in said annular body and the other bearing member being separable therefrom.

4. A timepiece movement as defined in claim 1, wherein the transversely extending shoulder on said bearing is provided intermediate the two end faces of the bearing.

5. In a timepiece movement, the combination with a frame member, said frame member having a shouldered recess provided at its bottom with a central aperture, a spindle passing freely through said aperture, a removable pivot bearing for said spindle loosely mounted in said recess and composed of an annular member having a conical outer surface in contact with the wall of said recess so as to permit a rocking movement of the pivot bearing, said annular member carrying a perforated bearing member fixedly mounted therein and a cap bearing member separable from the annular member, a resilient member yieldingly urging said pivot bearing into said recess and tending to center the bearing with respect to the recess, said annular member of the pivot bearing being provided with a shoulder normally extending in proximity to the shoulder of said recess and adapted to coact with the shoulder of the recess to limit the rocking movement of the pivot bearing due to a lateral displacement of the spindle.

6. In a pivot bearing for a watch balance spindle, the combination with a frame member, said frame member having a recess provided at its bottom with a central aperture for the passage of the spindle end, of a removable pivot bearing loosely carried in said recess, said bearing including a perforated bearing member and a cap bearing member, said recess in the frame member and said bearing having coacting surfaces for seating the bearing in the recess, one at least of said surfaces being conical; a resilient member yieldingly urging said removable bearing in contact with said surface of the recess of the frame member and tending to center the bearing in the recess, and coacting transversely extending shoulders on said frame member and on said bearing in close relationship with each other whereby upon a rocking movement of the bearing, said shoulders make contact to limit the inclination of the bearing.

7. In a timepiece movement, the combination with a frame member, said frame member having a recess provided at its bottom with a central aperture, of a spindle having its end extending freely through said aperture, a removable pivot bearing loosely carried in said recess, said bearing including a perforated bearing member and a cap bearing member, one of said bearing members being recessed to form a lodgment for receiving the other member, said recess in the frame and said bearing having coacting surfaces for seating the bearing in the recess, one at least of said surfaces being conical, a resilient member yieldingly urging said removable bearing in contact with said surface of the recess in the frame member and tending to center the bearing in the frame member, and coacting transversely extending shoulders on said frame member, and on said bearing in close relationship with each other to 8. In a pivot bearing for a watch balance spindle, the combination with a frame member, said frame member having a shouldered recess provided at its bottom with a central aperture for the passage of the spindle end, a circular pivot bearing for said spindle loosely mounted in said recess, the circumferential wall of said bearing including a conical surface coacting with the edge of said shoulder on said frame member to center the bearing in the recess and a cylindrical surface portion extending adjacent one end of the conical surface, and a transversely extending annular shoulder on said bearing normally extending in proximity to the shoulder of the frame member in the recess, and a resilient member acting on the bearing and yieldingly urging said conical surface in contact with the edge of said shoulder on said frame member.

9. In a pivot bearing for a watch balance spindle, the combination with a frame member, said frame member having a shouldered recess provided at its bottom with a central aperture for the passage of the spindle end, a circular pivot bearing for said spindle loosely mounted in said recess, said bearing including an annular member carrying a perforated bearing member and a cap bearing member, the circumferential wall of said annular member including a conical surface coacting with said shoulder on the frame member in the recess and a cylindrical surface portion adjacent the smaller end of the conical surface, and a transversely extending annular shoulder adjacent the other end of the conical surface and adapted to coact with the shoulder of the frame member in the recess thereof to limit rocking movement of the bearing in the recess, and a resilient member acting on the bearing and yieldingly urging said conical surface of the annular bearing member in contact with the edge of the shoulder on said frame member.

HENRI COLOMB.